Patented June 24, 1941

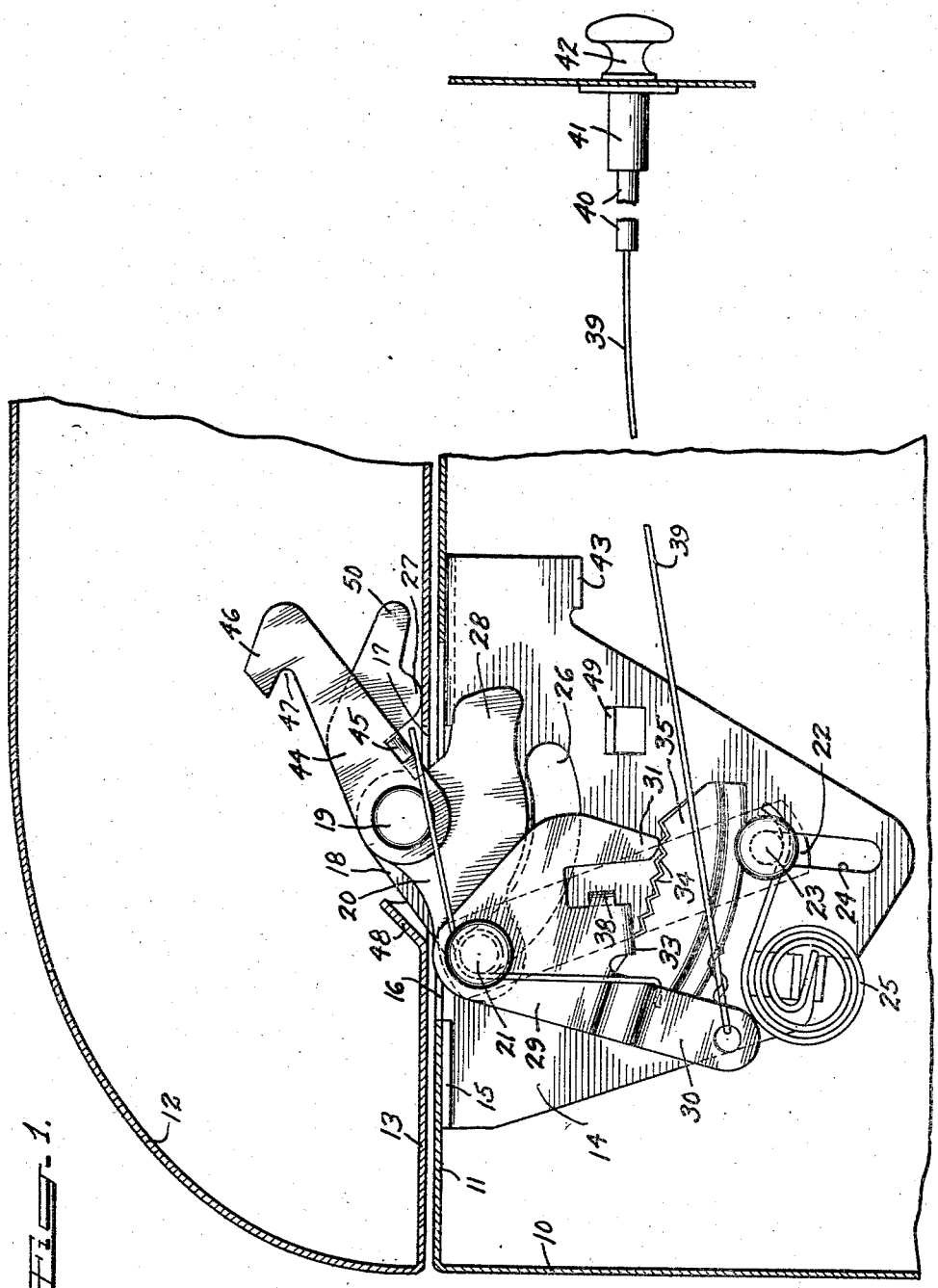

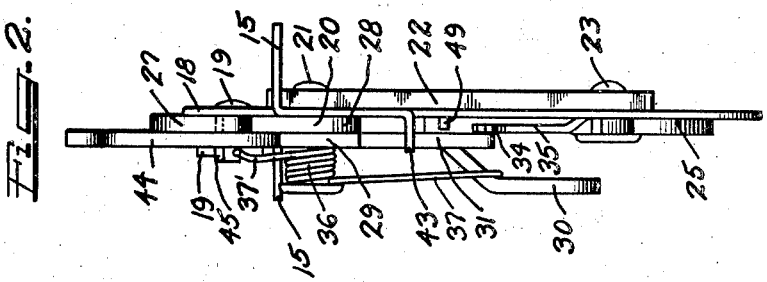
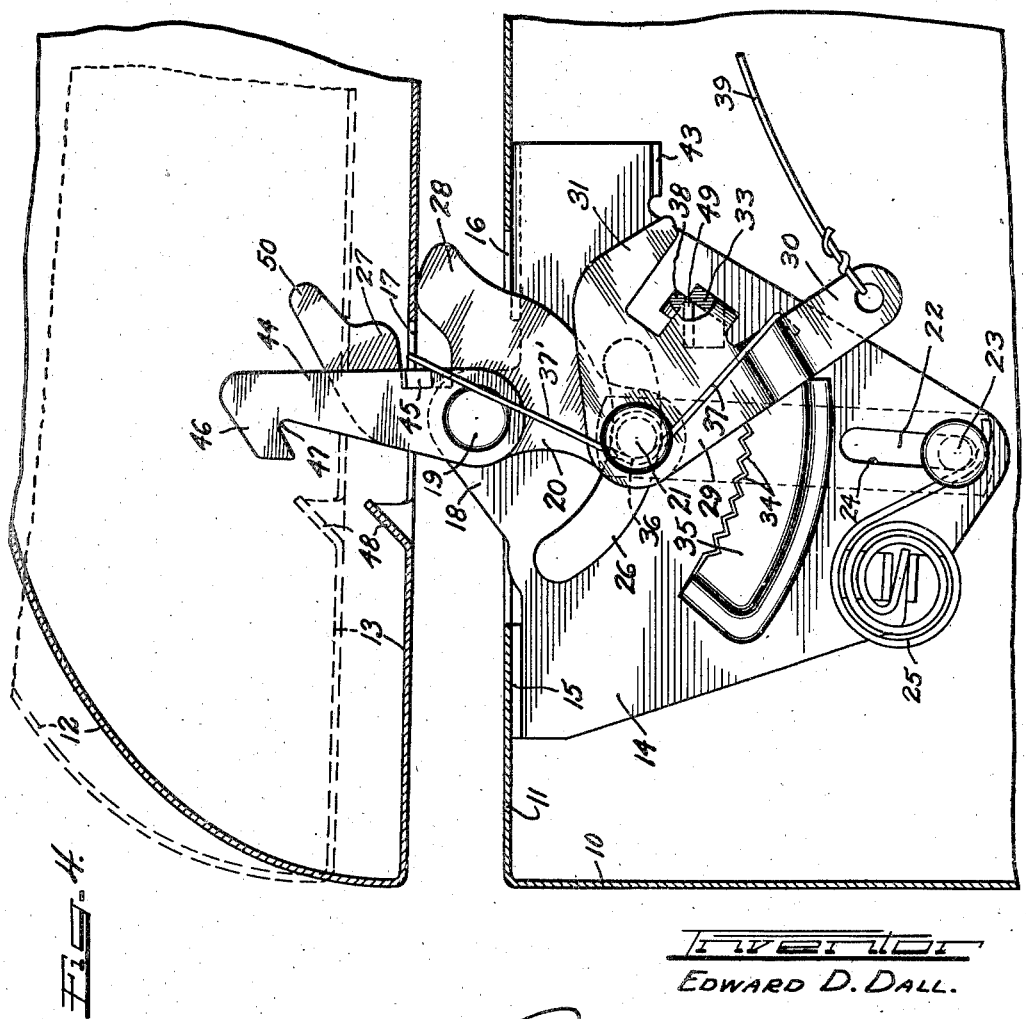

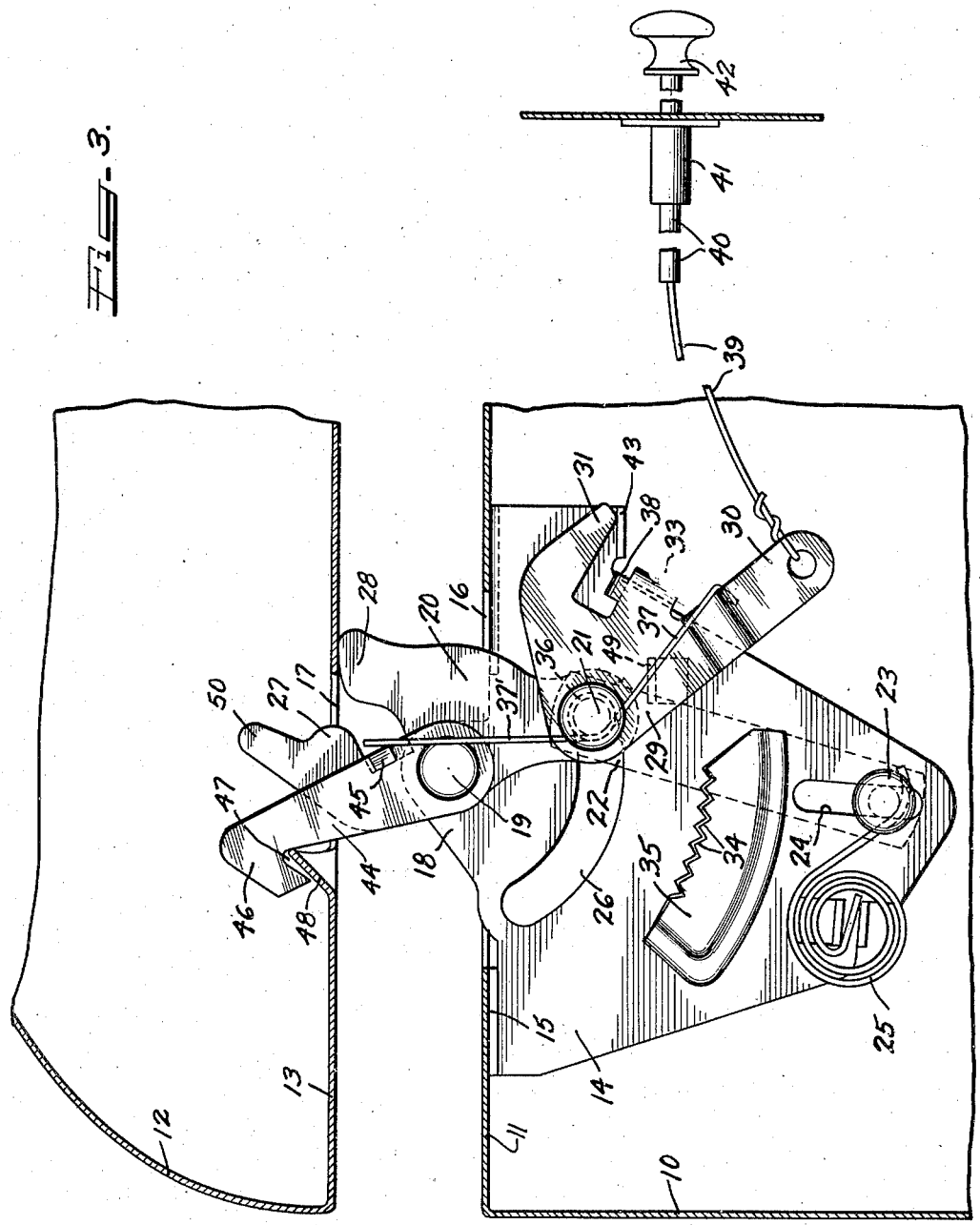

2,246,794

UNITED STATES PATENT OFFICE 2,246,794

AUTOMOBILE HOOD LATCHING STRUCTURE

Edward D. Dall, Detroit, Mich., assignor to Houdaille-Hershey Corporation, Detroit, Mich., a corporation of Michigan Application December 12, 1940, Serial No. 369,779

6 Claims. (Cl. 292—11)

This invention relates to automobile hood latching means adapted particularly for the latching control of hoods of the so-called "Alligator" type, which are hinged at their rear and along a hinge line extending transversely of the vehicle. Hoods of this type usually comprise a main latching mechanism controllable from inside the vehicle for effecting unlatching of the cover and a partial raising thereof, and additional latching means in the form of safety catch structure for preventing further opening movement of the cover or for limiting further opening movement of the cover after such partial opening thereof until certain operations are performed for releasing the cover for swing to its full open position. In my copending application Serial No. 364,782, filed November 8, 1940, latching assembly is disclosed in which, upon unlatching of the cover and partial raising thereof, the safety catch means will be in catch position to limit further opening movement of the cover, but such safety catch means will be rendered ineffective by a partial reclosing movement of the cover after partial opening thereof, so that the cover may then be fully opened.

The important object of my present invention is an improvement on the structure disclosed in my copending application, particularly in connection with the safety catch structure so that, when the cover is to be swung from its full open position to its closed position, the safety catch element associated with the main latch bolt may be more easily moved aside by the cover for engagement of the cover with the main latch bolt to swing the main latch bolt back to its latching position as the cover is fully closed.

My improved structure and arrangement is fully disclosed on the drawings, in which—

Figure 1 is a side elevation of the latching and safety catch structure, a portion of the hood body and the closed cover being shown in longitudinal vertical section;

Figure 2 is an end view of the latching and catch mechanism;

Figure 3 is a view similar to Fig. 1 showing the relative positions of the various parts after the control means within the vehicle has been operated for unlatching and partial raising of the hood cover; and Figure 4 is a view similar to Fig. 1 showing the arrangement of the parts after a partial downward swing of the cover.

The hood body 10 has a supporting plate 11 extending transversely at its forward end, and the cover 12 has a keeper plate 13 extending transversely at its forward end. The latch structure comprises a supporting base or plate 14 having laterally extending feet or flanges 15 by which it may be secured against the underside of the hood plate 11 to depend therefrom. The plate 11 has the passageway or slot 16 therethrough and the keeper plate 13 has the passageway or slot 17 therethrough for registration with the passageway 16 when the cover is closed. The base 14 has the upward extension 18 projecting through the passageway 16 and supporting a fulcrum stud 19 for the latch bolt 20.

At its lower end the bolt receives a stud 21 extending from the upper end of a link 22 located at the back of the base 14, this link, at its lower end, having a stud 23 extending therefrom through a guide slot 24 in the base 14, the stud being engaged by a spring 25 anchored on the plate 14, which spring exerts upward pressure against the link longitudinally thereof.

The stud 21 extends through the arcuate slot 26 in the base 14 which is concentric with the fulcrum stud 19 so that when the latch bolt is moved from latching or unlatching position the stud will travel in the slot. The neutral or center line of pressure of the spring 25 against the link 22 extends through the fulcrum 19 and the lower stud 23 of the link, so that, after the stud 21 at the upper end of the link is moved past this line, the spring pressure will rapidly complete such movement of the stud in the slot and consequently complete the movement of the latch bolt to its latching or unlatching position.

The latch bolt has a latching arm 27 which, when the cover is closed as shown on Fig. 1, is held by the pressure of the spring 25 against the top of the keeper plate 13 to hold the cover firmly closed. Below the latching arm 27 the latch bolt has the raising arm 28 which, when the latch bolt is swung to unlatching position, will engage with the underside of the keeper plate 13 for a partial raising of the cover, as shown on Fig. 3.

Receiving the stud 21 in front of the latch bolt is the downwardly extending detent member 29 having the outer arm 30 and the inner arm 31. Between these arms the detent element is deflected to provide a detent tooth 33 for cooperation with the detent teeth 34 formed along the edge of a portion 35 deflected out of the base 14, the teeth 34 being in an arcuate row concentric with the fulcrum stud 19. When the latch bolt is in its latching position as shown on Fig. 1, the tooth 33 will be at the inner end of the tooth row 34 so that the latch bolt will be locked against swing thereof to unlatching position. A hairpin spring 36 is anchored on the stud 21, its one end 37 engaging the arm 30 of the detent member 29 and tending to hold the detent member in its locking position when the latch bolt is in latching position.

The detent member 29 has another tooth or abutment 38 extending at substantially right angles with the detent tooth 33, these two teeth being deflected toward the base 14 to engage with their ends against the base as the detent member is operated. When the detent member is swung toward the right (Fig. 1) the tooth 33 will be disengaged from the detent teeth 34 so as to unlock the latch bolt for swing to unlatching position, and then, upon continued swing of the detent member, the abutment tooth 38 will engage with the under edge of the latch bolt and the latch bolt will be positively swung towards its unlatching position until the stud 21 passes through the center line of spring pressure, whereafter the spring pressure will quickly snap the latch bolt to its unlatching position, as shown on Fig. 3. For swinging the detent member 29, the wire 39 extends from the end of the detent arm 30 to a bar 40 slidable in a sleeve 41 secured preferably to the instrument board of the vehicle, the end of the bar having a knob 42 thereon. When this knob is pulled out, the detent member will be operated for unlocking of the latch bolt, and swinging of the latch bolt toward its unlatching position.

At its inner end the base 14 has a portion deflected forwardly therefrom to provide an abutment ledge 43 in the path of the end of the inner arm 31 of the detent member 29. When this detent member is swung upwardly by pull on the knob 42 into engagement with the latch bolt, and the latch bolt is swung toward unlatching position, the end of the arm will travel above the ledge 43, and when the knob 42 is released, the spring end 37 will swing the detent member down until the end of the arm 31 engages the ledge 43, as shown on Fig. 3. The cover is now fully unlatched and held in partially opened position by the raising arm 28 of the latch bolt.

A safety catch element in the form of an arm 44 extends upwardly along the front side of the latch bolt 20 and at its lower end is fulcrumed on the stud 19. At its rear edge this safety catch arm has a stop 45 whose rear end engages against the inner side of the latch bolt between the latch bolt arms 27 and 28, and whose front end is engaged by the end 37' of the spring 36, the spring pressure tending to hold this safety catch arm in its forward position with the stop 45 against the latch bolt so that the arm 44 will tend to follow the movement of the latch bolt.

The safety catch arm has the hook end 46 for receiving in its mouth 47 the keeper tongue 48 which may be deflected out of the keeper plate 13. When the main latch bolt is rocked to latching position, the safety catch arm will be carried therewith to its ineffective position, as shown on Fig. 1. When the latch bolt is moved to unlatching position for partial raising of the cover, the safety catch arm 44 will swing forwardly with the bolt to bring its hook end above the keeper tongue 48 so as to safety catch the cover against further opening movement, as shown on Fig. 3. Before the cover can be further raised, it must first be swung a short distance downwardly for engagement of the keeper plate 13 with the raising arm 28 of the latch bolt. Referring to Fig. 4, such downward movement of the cover will swing the latch bolt 20 in latching direction, and during such movement of the bolt the end of the arm 31 of the detent member 29 will be withdrawn from the ledge 43. Upon such release of the detent member, the spring end 37 will swing it down for engagement of its teeth or abutments 33 and 38 with a stop 49 on the base 14, which stop may be formed by deflecting forwardly a portion of the base. Such engagement of the detent member with the stop occurs just after the downward pressure on the cover has caused the stud 21 to pass a short distance beyond the center line of pressure of the spring 25, and this spring pressure will tend to continue rocking of the latch bolt to its latching position which movement is prevented by the stop 49. This stoppage of the latch bolt also stops further downward movement of the cover, but after such downward movement of the cover, the safety catch arm 44 will have been moved with the latch bolt to withdraw its hook end from above the path of the keeper tongue 48, as shown on Fig. 4. As the entirely released cover is now raised toward its full open position, the edge of the keeper plate 13 at the inner end of the passage 17 will encounter the cam arm 50 on the latch bolt above its latching arm 27, and the latch bolt with the safety catch arm 44 thereon will be swung forwardly. However, before such forward swing starts, the end of the keeper tongue 48 will be in front of the hook end 46 and by the time the latch bolt and safety catch arm are swung fully forwardly, the keeper tongue 48 will be above the end of the safety catch arm.

Engagement of the keeper plate 13 with the cam arm 50 of the latch bolt when the cover is being raised will rock the latch bolt toward unlatching direction until the stud 21 passes to the right of the center line of pressure from the spring 25 (Fig. 4) and then this spring pressure will quickly rock the latch bolt to its unlatching position and with the safety catch arm 44 moved therewith to its catch position as shown on Fig. 3. As the stud 21 is moved past the spring pressure center line, the detent member 29 will be moved rearwardly from the position shown on Fig. 4 to release its abutments 33 and 38 from the stop 49 so that the spring end 37 may swing the detent member down with its tooth 33 against the inner beveled end of the detent wall 35, the arm 31 remaining below the ledge 43 during such movement of the detent member.

When the opened cover is now swung down for closing of the hood, the keeper tongue 48 will engage with the inclined upper edge of the hook end 46 on the safety catch arm 44 and this arm may be readily cammed rearwardly out of the way against the comparatively light resistance of the spring end 37', and after passage of the keeper tongue past the hook end, the spring will swing the safety catch arm forwardly back to its effective or catch position shown on Fig. 3. At substantially the same time, the keeper plate 13 will engage with the raising arm 28 of the latch bolt 20, the downward pressure of the cover then rocking the latch bolt towards its latching position, for completion of such movement by the cross over spring pressure, the latching arm 27 of the bolt being finally brought into engagement with the top of the keeper plate 13, the spring pressure then holding the latch bolt in its latching position for secure closing of the cover against rattling. As the latch bolt is thus returned to its latching position, the detent member 29 will be drawn forwardly with the latch bolt along the detent wall 35 for engagement of its detent tooth 33 with one of the detent teeth 34 so as to lock the latch bolt in its latching position. Such return of the detent member to its locking position also causes the control knob 42 in the vehicle body to be pulled back to its normal position.

By having the safety catch member 44 movable relative to the latch bolt and held in its operative or catch position by a comparatively weak spring, a comparatively light downward pressure on the cover will suffice to swing the safety catch member out of the way for full closing of the cover. Thus, if the cover should be swung down with the keeper member 13 against the raising arm 28 of the latch bolt, but the attendant neglects to finally close the cover, the safety catch element will be in catch position relative to the keeper tongue 46 and the cover will be latched against full opening, and before the cover can again be released for full opening it must be closed far enough for sufficient rocking of the latch bolt for swing of the safety catch arm to ineffective position.

I have shown a practical and efficient embodiment of the features of my invention, but I do not desire to be limited to the exact construction, arrangement and operation as shown and described, as changes and modifications may be made without departing from the scope of the invention.

I claim as follows:

1. Latching assembly for an automobile hood comprising keeper structure on the hood cover, a latch bolt within and supported by said hood body, a safety catch arm on said latch bolt, said latch bolt being normally in position for engagement with said keeper structure to hold the hood cover closed and with said safety catch arm in inoperative position, means for effecting movement of said latch bolt to a full unlatching position and partial raising thereby of said cover and coincidental movement of said safety catch arm to operative position relative to said keeper structure to limit further opening movement of the cover, means rendered effective by a partial closing movement of said cover after partial opening thereof for effecting setting and holding of said latch bolt in an intermediate unlatching position and with said safety catch arm set to release said cover for further opening movement thereof, and means whereby said keeper structure is cooperable with said latch bolt upon such further opening movement of the cover to cause said latch bolt to be restored to its full unlatching position and with said safety catch arm in effective position after such further opening of the cover.

2. Latching assembly for an automobile hood comprising keeper structure on the hood cover, a latch bolt within and supported by the hood body, a safety catch arm on said latch bolt, said latch bolt being normally in position for engagement with said keeper structure to hold the hood cover closed and with said safety catch arm in ineffective position, means for effecting movement of said latch bolt to a full unlatching position and partial raising thereby of said cover and setting of said safety catch arm to effective position relative to said keeper structure to limit further opening movement of the cover, means rendered effective by a partial closing movement of said cover after partial opening thereof for causing setting and holding of said latch bolt in an intermediate unlatching position and with said safety catch arm set to release said cover for further opening movement thereof, said keeper structure upon further opening movement of the cover being first movable beyond the range of said safety catch member, and means whereby said keeper structure will then engage with said latch bolt to cause return of said latch bolt to its full unlatching position and movement of said safety catch member back to effective position.

3. Latching assembly for an automobile hood comprising keeper structure on the hood cover, a latch bolt within and supported by the hood body, a safety catch arm on said latch bolt, said latch bolt being normally in position for engagement with said keeper structure to hold the hood cover closed and with said safety catch arm in ineffective position, means for effective movement of said latch bolt to a full unlatching position and partial raising thereby of said cover and setting of said safety catch arm to effective position relative to said keeper structure to limit further opening movement of the cover, means rendered effective by a partial closing movement of said cover after partial opening thereof for causing setting and holding of said latch bolt in an intermediate unlatching position and with said safety catch arm set to release said cover for full opening movement thereof, said keeper structure upon full opening movement of the cover being first movable beyond the range of said safety catch member and then cooperating with said latch bolt to cause return of said latch bolt to its full unlatching position and movement of said safety catch member back to effective position, said safety catch member being movable on said latch bolt, spring means tending to hold said safety catch member in a normal position on said latch bolt to follow the movements thereof, and means affording cam engagement of said keeper structure with said safety catch member when said cover is moved back from full open position to its partially opened position whereby said safety catch member will be moved against said spring from its normal position and then returned by the spring to its normal position to prevent reopening movement of the cover after such return of the cover to its partially opened position.

4. Latching assembly for an automobile hood comprising a latch bolt within the hood normally holding the hood cover closed, means controlled from outside of said hood for effecting movement of said latch bolt to unlatch the cover and effect a partial opening thereof, a safety catch element movable with said latch bolt to be held thereby in ineffective position when the latch bolt is in latching position and in cover catching position when said latch bolt is moved to unlatching position, means whereby upon partial closing movement of said cover after partial opening thereof said latch bolt will be moved in latching direction to an intermediate unlatching position for setting of said safety catch member to ineffective position so that the cover may be fully opened, means for holding said latch bolt in such intermediate position, and means whereby upon such full opening movement of the cover said cover will engage with said latch bolt and move it back to full unlatching position with said safety catch member in catching position.

5. Latching assembly for an automobile hood comprising keeper structure on the hood cover, a latch bolt within and supported by the hood body, a safety catch member carried by and movable on said latch bolt, spring means tending to hold said safety catch member in a normal position on said latch bolt, means controlled from outside of said hood for causing said latch bolt to unlatch and partially open the hood cover and to carry said safety catch member into effective position relative to the keeper structure for preventing further opening movement of the cover, said cover when moved a distance in closing direction after partial opening thereof effecting a return movement of said latch bolt in latching direction sufficient for the latch bolt to carry said safety catch member therewith into an ineffective position relative to the keeper structure so that the cover is released for full opening, locking means for locking said latch bolt in such partially returned position, means on said latch bolt engageable by said cover when moved to full open position for effecting unlocking of said latch bolt and return thereof with said safety catch member from said partially returned position back to its unlatching position to reset said safety catch member to effective catch position, and means affording cam engagement between said keeper structure and said safety catch member when said cover is moved from full open position back to its partially opened position whereby said safety catch member is moved against said spring means from its normal position and then returned by said spring means to its normal position to prevent reopening movement of said cover after such return thereof to its partially opened position.

6. Latching assembly for an automobile hood comprising keeper structure on the hood cover, a latch bolt on the hood body, a safety catch member movably mounted on said latch bolt, spring means tending to hold said safety catch member in a normal position on said latch bolt, said latch bolt being normally in latching position to hold the cover closed and said safety catch member being normally in ineffective position relative to said keeper structure, a detent element movable on said latch bolt, means controllable from outside of said hood for moving said detent member to a first position during which movement said latch bolt is moved to unlatch said cover and to engage therewith to effect a partial opening thereof and said safety catch member is moved to catch positon relative to said keeper structure to prevent further opening movement of said cover, a partial closing movement of said cover after partial opening thereof causing said cover to move said latch bolt back in latching direction sufficient to set said safety catch member in ineffective position so that said cover is free for full opening movement, said detent element being released from said first position upon movement of said latch bolt in latching direction, stop means engageable by said detent element to limit such movement of the latch bolt back in latching direction, means on said latch bolt engageable by said cover when said cover is moved toward full opening position after partial movement thereof in closing direction for causing return of said latch bolt to its unlatching position and resetting of said safety catch member to effective position, means effective during such return of the latch bolt to unlatching position to release said detent from said stop means, and means affording cam engagement between said keeper structure and said safety catch member when said cover is moved from full open position to its partially opened position whereby said safety catch member is moved against said spring means from its normal position and then returned by said spring means to its normal position to prevent reopening movement of said cover after such return thereof to its partially opened position, said cover being then engageable with said latch bolt for movement thereof back to latching position and setting of said safety catch member to ineffective position as said cover is fully closed.

EDWARD D. DALL.